United States Patent

Hesse et al.

[11] Patent Number: 5,935,515
[45] Date of Patent: Aug. 10, 1999

[54] PROCESS FOR THE PRODUCTION OF POLYCHROME CERAMIC SHAPED PARTS

[75] Inventors: Werner Hesse, Obrigheim; Birgit Tommuscheit, Ludwigshafen, both of Germany

[73] Assignee: BASF Aktiengesellschaft, Ludwigshafen, Germany

[21] Appl. No.: 08/978,007

[22] Filed: Nov. 25, 1997

Related U.S. Application Data

[63] Continuation of application No. 08/520,699, Aug. 29, 1995, abandoned.

[30] Foreign Application Priority Data

Sep. 12, 1994 [DE] Germany ............... 44 32 459

[51] Int. Cl.⁶ ............................................. C04B 33/32
[52] U.S. Cl. ............................ 264/642; 264/670
[58] Field of Search ........................... 264/642, 669, 264/670

[56] References Cited

U.S. PATENT DOCUMENTS

| 4,267,209 | 5/1981 | Hanson | 427/199 |
| 4,923,658 | 5/1990 | Hover et al. | 264/76 |
| 5,188,782 | 2/1993 | Bittler et al. | 264/82 |
| 5,554,393 | 9/1996 | Uchida et al. | 425/92 |

FOREIGN PATENT DOCUMENTS 191 122   12/1993   Czechoslovakia .

OTHER PUBLICATIONS

Derwent Publications Ltd., Database WPI, Week 8008, An 80–14079c (English abstract of JP–A 55 003 315).

Derwent Publications Ltd., Database WPI, Week 8414, AN 84–085226 (English abstract of JP–A 50 035 063).

*Primary Examiner*—Christopher A. Fiorilla
*Attorney, Agent, or Firm*—Keil & Weinkauf

[57] ABSTRACT

In a process for producing polychrome ceramic shaped parts, at least two granulates formed from ceramic powder, binder and color-producing particles are shaped, subjected to binder removal and sintered. The granulates are formed from different color-producing particles and/or different concentrations of the same color-producing particles.

16 Claims, No Drawings

PROCESS FOR THE PRODUCTION OF POLYCHROME CERAMIC SHAPED PARTS

This application is a continuation of application Ser. No. 08/520,699, filed on Aug. 29, 1995 now abandoned.

BACKGROUND OF THE INVENTION

1. Field of the Invention

The invention relates to a process for producing polychrome ceramic shaped parts, to polychrome ceramic shaped parts themselves and unfired ceramic shaped parts.

2. Description of the Related Arts

Colored ceramic shaped parts can be produced by sintering a granulate. Color-producing particles are here mixed with the ceramic powder and, if desired, sintering aids to give a granulate. For the purposes of the present invention, color-producing particles are particles which have the desired color before sintering or develop the desired color only during the sintering process. The components are mixed by a milling process or by precipitating-on from a solution. In both cases, the mixture subsequently has to be dried, in the case of precipitating-on of a solution it is frequently necessary to calcine the powder mixture. Shaping can be carried out by cold or hot isostatic pressing. Sintering then gives a single-colored ceramic shaped part. These two methods of coloration are technically complicated.

A specific process for preparing ruby red aluminum oxide ceramic is described in the Czechoslovakian Patent CS 191 122. The granulate here comprises a mixture of aluminum oxide ceramic powder and a binder. After mixing, this granulate is injection molded. The shaped parts are colored by impregnation with a chromium chloride solution after partial removal of the binder. The impregnated shaped part is subsequently sintered. However, it is a disadvantage that demixing phenomena occur during impregnation and subsequent drying, because the chromium chloride is predominantly absorbed on the surface, although the solvent fully penetrates into the shaped part. A homogeneous color distribution cannot be achieved using this method.

Owing to the difficulties associated with just single-colored ceramic shaped parts, it has hitherto not been possible to produce polychrome ceramic shaped parts. The only known method is the mixing in of a number of different color-producing particles to give a granulate, so that in the case of non-mixable colorants uncontrollably speckled ceramic shaped bodies can be formed.

It is an object of the present invention to provide a process for producing polychrome ceramic shaped parts having good coloration and color distribution properties. In particular, the production of a defined interface between the color phases should be made possible. This process should be simple and flexible. A further object of the invention is the provision of polychrome ceramic shaped parts and of unfired ceramic shaped parts.

SUMMARY OF THE INVENTION

We have found that this object is achieved by the process described in the claims. According to this process, at least two granulates comprising ceramic powder, binder and color-producing particles are shaped, subjected to binder removal and sintered. The granulates thus contain different color-producing particles and/or different concentrations of the same color-producing particles. The granulates are melted together or separately, the melts are combined and mixed either not at all or only slightly and subsequently shaped together to give a green shaped body (unfired part). The binder is then removed from the unfired part and the unfired part from which the binder has been removed is sintered to give the usable shaped body.

BRIEF DESCRIPTION OF THE DRAWINGS

Color-producing particles are those particles which are colored even during the mixing of the granulate or which develop their color only during the production process, in particular during the sintering process. Preferred color-producing particles are metal powders, metal oxide powders, their precursor compounds which form metal oxides on heating, pigments or mixtures of these materials. Particular preference is given to using lanthanides or their oxides, metals of the group Co, Cr, Cu, Fe, Mn, Mo, Nb, Ni, Pb, Si, Sn, Ti, V, W or their oxides, in particular oxides of the group $CoO$, $Co_2O_3$, $Co_3O_4$, $Cr_2O_3$, $Cu_2O$, $CuO$, $Fe_2O_3$, $Fe_3O_4$, $MnO$, $Mn_2O_3$, $MnO_2$, $MoO_2$, $MoO_3$, $NbO$, $NbO_2$, $Nb_2O_5$, $NiO$, $PbO$, $PbO_2$, $SiO_2$, $SnO$, $SnO_2$, $TiO$, $Ti_2O_3$, $TiO_2$, $VO_2$, $V_2O_5$, $WO_2$, $W_2O_5$, $WO_3$. Particular preference is also given to using metal salts or metal complexes, in particular carboxylates, carbonates, nitrates or acetylacetonates, which are converted into the color-producing oxides during sintering. Preference is likewise given to the use of chromatic pigments from the crystal structure classes baddeleyite, hematite, cassiterite, corundum, olivine, rutile, sphene, spinell and zircon as color-producing particles. The granulate can here comprise a plurality of different color-producing particles. Many new colors can be created in this way. Color modifications can also be achieved by using metal powders instead of metal oxide powders. The color after sintering in an oxidizing atmosphere is frequently significantly brighter when metal powders are used than when the corresponding metal oxide powder is used.

The color-producing particles preferably have particle sizes below 10 $\mu$m, more preferably below 5 $\mu$m. The color-producing particles are preferably present in the granulate composition used or in a feedstock composition for injection molding in a proportion by weight of from 0.05% to 20%.

In another preferred embodiment, the ceramic powder comprises aluminum oxide, zirconium oxide, yttrium oxide, cerium oxide, magnesium oxide, SiC, $Si_3N_4$ or a combination or a mixture thereof. The ceramic powder can here also consist essentially of one of these materials. Thus, in the production of an aluminum oxide or zirconium oxide ceramic, yttrium oxide or magnesium oxide can be added as stabilizer or sintering aid.

Preferred binders are polyacetals, in particular polyoxymethylenes, and also the copolymers and homopolymers of polyoxymethylenes. A combination of a plurality of binders can also be used, Apart from the binder, the injection-molding granulate can also contain organic additives as dispersants and for surface modification. In addition, wetting agents, plasticizers or other auxiliaries which influence the rheological properties of the granulates during the shaping process can also be added.

The mixtures of ceramic powder, binder and color-producing particles are usually compounded or extruded at temperatures of from 115 to 200° C., subsequently cooled and granulated. The granulates obtained can be processed by means of conventional presses or multicomponent injection-molding machines.

The various granulates can here be mixed in such a way as to give ceramic parts having exact delineation of the differently colored regions, but it is also possible to produce marbled parts. Likewise, writing can be molded onto ceramic parts and decorations of all types can be produced on the surface of ceramic shaped parts.

The mixture of the granulates is subsequently shaped at, typically, from 175 to 200° C. and at pressures of from 200 to 2000 bar. The unfired parts are removed from the mold and then subjected to binder removal.

The method of removing the binder from the unfired ceramic part depends on the type of binder used. The removal of binders comprising polyacetals is preferably carried out in a gaseous atmosphere containing acid or boron trifluoride.

The molded ceramic shaped parts from which the binder has been removed are preferably sintered in air, in an inert gas atmosphere, in a reducing atmosphere, under reduced pressure or at a particular oxygen partial pressure. In a preferred process variant, ceramic shaped parts of a particular color are produced by particular sintering conditions. The selection of the sintering atmosphere makes it possible to alter a color in shades or very distinctly. The latter is the case, for instance, if the valence of a metal cation is changed. Thus, an unfired body colored pink with iron zirconium silicate becomes brown when sintered in air, while it becomes green when sintered in a reducing atmosphere. An unfired body colored with flesh-colored $Mn_2O_3$ becomes pink in an inert gas atmosphere, black in air.

A plurality of granulates containing different color-producing particles or different concentrations of the same type of color-producing particle are preferably processed by multicomponent injection molding or by pressing. In the latter type of process, adjustment of the pressing conditions enables the desired sharpness of the color separation at the interface between differently colored regions of the ceramic shaped parts to be obtained. The targeted operation of pressing time, pressing temperature and pressing pressure leads to sharp or diffused color boundaries. The sintering conditions selected are also important for the formation of the boundary phases.. Since sintering involves diffusion of ions, the boundary zone of two colors is all the more diffuse the longer the sintering time and the higher the sintering temperature.

The various processed granulates preferably have the same inorganic solids content by volume. This ensures the same shrinkage of the different color phases during sintering, which reduces the probability of fracture of the ceramic along the contact points of two phases. The danger of fracture at phase boundaries can also be decreased by a crystal-chemical matching of the differently colored phases. This is achieved, for example, by the incorporation of suitable cations into a particular type of structure.

The object of providing polychrome ceramic shaped parts is achieved according to the invention by the provision of ceramic parts comprising at least two granulates as described above which have been shaped, subjected to binder removal and sintered. The polychrome ceramic shaped parts are preferably produced by a process as described in the process claims. The polychrome ceramic shaped parts are preferably configured as decorative parts, in particular components of clocks and watches, jewelry, (rings, chains, cuff-links, brooches, tie pins, bracelets, etc.), writing implements, tools, household articles, decorative mountings on doors, lighters, vases, lamps, buttons, religious articles (crucifixes, holy statues, rosaries) or as tiles.

According to the objectives, there are also provided unfired ceramic shaped parts made of at least two shaped granulates comprising ceramic powder, binder and color-producing particles. These granulates comprise different color-producing particles and/or different concentrations of the same color-producing particles. Such unfired ceramic shaped parts are preferably shaped by a process as claimed in one of the process claims. Unfired parts are shaped parts which have not yet been subjected to binder removal and sintering.

EXAMPLE 1

An injection-molding granulate comprised 1000 g of zirconium dioxide stabilized with 3 mol % of $Y_2O_3$. The mean particle size was 0.3 μm. 17 g of polyethylene glycol having a molecular weight of about 800, 23 g of polybutanediol formal having a molecular weight of about 80,000 and 168 g of polyoxymethylene containing 2% by weight of butanediol formal were mixed in. As color-producing material, 20 g of FeCrNi spinell (black) were added in the first case and 14 g of CoAl spinell were added in the second case. The compositions obtained were each mixed in a compounder and admixed with 300 ml of butyl glycol. The mixtures were compounded further while heating, with the solvent being slowly drawn off. Compounding was subsequently continued at about 175° C. for a further hour and the mixture was cooled and granulated.

The differently colored compositions were distributed in a rectangular pressing mold (60×20×4 mm) and shaped by axial pressing at 180° C. under a pressure of 300 bar. In one case the distribution was arbitrary, another time the differently colored compositions were strictly separated, and in a further experiment the one composition was placed in the rectangular pressing mold and, by means of a template, the inscription "BASF" made up of the other composition was applied to the first composition.

The shaped parts thus obtained had the binder removed under acid catalysis using gaseous oxalic acid at 130° C. The subsequent sintering was carried out at 1500° C. in air, with the hold times being varied between 20 minutes and 4 hours. In all cases, this gave ceramic parts having densities of more than 6 g/ml which were free of cracks or distortion. Depending on the sintering times, the samples had transition zones of different widths between the differently colored regions. At a hold time of 20 minutes, virtually no transition zone could be seen, while at a hold time of 4 hours a mixing zone having a width of 3.5 mm could be seen.

EXAMPLE 2

From the two differently colored injection-molding granulates of Example 1, round marbled disks having a diameter of 10 cm and a thickness of 5 mm were injection molded at a composition temperature of 170° C. and a tool temperature of 135° C. using an injection-molding machine fitted with a special screw for producing a marble effect. Sintering at 1500° C. in an argon atmosphere instead of air gave a significantly brighter blue color, while the black remained unaltered.

EXAMPLE 3

700 g of aluminum oxide having a mean particle size of 0.8 μm were processed with 15 g of $Cr_2O_3$ powder or 15 g of $Co_2O_3$ powder and the other binder components and additives as described in Example 1 to each give a granulate. As described in Example 1, pressed pieces each containing the two differently colored compositions were then molded. They were subsequently subjected to binder removal and sintered at 1650° C. in air. The colors obtained were pink and blue, since the green $Cr_2O_3$ is incorporated into the corundum lattice and thus assumes the red color of ruby. The surface had a matt sheen.

EXAMPLE 4

1000 g of yttrium-stabilized zirconium oxide was processed with 18 g of praseodymium zirconium silicate and the other binder components and additives as described in Example 1 to give a granulate. In the injection molding procedure, this granulate was mixed with the granulates described in Example 1. After binder removal, the unfired parts were sintered at 1500° C. in air. The ceramic shaped parts obtained had four colors. Apart from the pure colors, yellow, black and blue, a broad pale blue region appeared between the yellow and the blue phase.

We claim:

1. A process for producing polychrome shaped parts, comprising the steps of shaping at least two granulates comprising ceramic powder, a polyacetal binder, and color producing particles;

removing the binder of said granulates by treating said granulates in a gaseous atmosphere containing acid or boron trifluoride;

sintering said granulates after binder removal;

wherein the granulates contain different color-producing particles and/or different concetrations of the same color-producing particles and wherein, in at least one of the granulates, the polyacetal is present in a proportion of from 30% to 60% by volume of the granulate.

2. A process as claimed in claim 1, wherein at least one of the granulates comprises metal powder, metal oxide powder, their precursor compounds or pigments as color-producing particles.

3. A process as claimed in claim 1, wherein at least one of the granulates comprises lanthanides or their oxides, metals of the group Co, Cr, Cu, Fe, Mn, Mo, Nb, Ni, Pb, Si, Sn, Ti, V, W or their oxides, in particular oxides of the group CoO, $Co_2O_3$, $Co_3O_4$, $Cr_2O_3$, $Cu_2O$, CuO, $Fe_2O_3$, $Fe_3O_4$, MnO, $Mn_2O_3$, $MnO_2$, $MoO_2$, $MoO_3$, NbO, $NbO_2$, $Nb_2O_5$, NiO, PbO, $PbO_2$, $SiO_2$, SnO, $SnO_2$, TiO, $Ti_2O_3$, $TiO_2$, $VO_2$, $V_2O_5$, $WO_2$, $W_2O_5$, $WO_3$, metal salts or metal complexes, in particular carboxylates, carbonates, nitrates or acetylacetonates, or chromatic pigments from the crystal structure classes baddeleyite, hematite, cassiterite, corundum, olivine, rutile, sphene, spinel or zircon as color-producing particles.

4. A process as claimed in claim 1, wherein at least one of the granulates comprises a plurality of different color-producing particles.

5. A process as claimed in claim 1, wherein at least one of the granulates comprises the ceramic powder aluminum oxide, zirconium oxide, yttrium oxide, cerium oxide, magnesium oxide, SiC, $Si_3N_4$ or a combination or a mixture thereof.

6. A process as claimed in claim 1, wherein in at least one of the granulates the color-producing particles have particle sizes below 10 micrometers.

7. A process as claimed in claim 1, wherein in at least one of the granulates the color-producing particles are present in a proportion of from 0.05% by weight to 20% by weight of the granulate.

8. A process as claimed in claim 1, wherein the granulates are processed by multicomponent injection molding.

9. A process as claimed in claim 1, wherein the granulates are processed by pressing.

10. A process as claimed in claim 9, wherein the desired sharpness of the color separation at the interface between differently colored regions of the ceramic parts is produced by adjusting the pressing conditions.

11. A process as claimed in claim 1, wherein the granulates have the same inorganic solids content by volume.

12. A process as claimed in claim 1, wherein the ceramic shaped parts from which the binder has been removed are sintered in an inert gas atmosphere, in a reducing or oxidizing atmosphere or under reduced pressure.

13. A process as claimed in claim 12, wherein the oxidizing atmosphere is air.

14. A process as claimed in claim 1, wherein ceramic shaped parts of a particular color are produced by particular sintering conditions.

15. A process as claimed in claim 1 wherein the binder polyacetal is selected from the group consisting of polyoxymethylene, polyoxymethylene copolymer, polyoxymethylene homopolymer or a combination of two or more of these materials.

16. A process as claimed in claim 1, wherein in at least one of the granulates the color-producing particles have particle sizes below 5 micrometers.

* * * * *